US 7,143,149 B2

(12) United States Patent
Öberg et al.

(10) Patent No.: US 7,143,149 B2
(45) Date of Patent: Nov. 28, 2006

(54) DYNAMIC OPERATOR FUNCTIONS BASED ON OPERATOR POSITION

(75) Inventors: Pierre Öberg, Västerås (SE); Jan-Erik Frey, Västerås (SE)

(73) Assignee: ABB AB, Västerås (SE)

( * ) Notice: Subject to any disclaimer, the term of this patent is extended or adjusted under 35 U.S.C. 154(b) by 666 days.

(21) Appl. No.: 09/960,080

(22) Filed: Sep. 21, 2001

(65) Prior Publication Data

US 2003/0061295 A1    Mar. 27, 2003

(51) Int. Cl.
*G06F 15/16*    (2006.01)

(52) U.S. Cl. .................... 709/220; 709/250; 455/426.2

(58) Field of Classification Search ........ 709/202–211, 709/217–238, 250; 455/426.2–433; 340/3.1
See application file for complete search history.

(56) References Cited

U.S. PATENT DOCUMENTS

| | | | |
|---|---|---|---|
| 5,598,572 A | | 1/1997 | Tanikoshi et al. |
| 6,167,464 A | * | 12/2000 | Kretschmann ................ 710/15 |
| 6,522,881 B1 | * | 2/2003 | Feder et al. ................ 455/437 |
| 6,754,562 B1 | * | 6/2004 | Strege et al. ................ 700/279 |
| 6,754,833 B1 | * | 6/2004 | Black et al. ................ 726/7 |
| 6,757,521 B1 | * | 6/2004 | Ying ........................ 455/67.11 |
| 6,776,334 B1 | * | 8/2004 | Garg ........................... 235/384 |
| 6,801,782 B1 | * | 10/2004 | McCrady et al. ............ 455/517 |
| 6,836,667 B1 | * | 12/2004 | Smith, Jr. ................ 455/456.1 |
| 6,922,558 B1 | * | 7/2005 | Delp et al. ................ 455/420 |
| 2003/0045275 A1 | * | 3/2003 | McDonagh et al. ......... 455/414 |
| 2005/0281237 A1 | * | 12/2005 | Heinonen et al. ........... 370/338 |

FOREIGN PATENT DOCUMENTS

| WO | WO 9319414 A1 | 9/1993 |
|---|---|---|
| WO | WO 9612993 A1 | 5/1996 |

* cited by examiner

*Primary Examiner*—Saleh Najjar
*Assistant Examiner*—Asad Mohamed Nawaz
(74) *Attorney, Agent, or Firm*—Marcia L. Doubet

(57) ABSTRACT

A communication system that enables an operator to remotely query and control the process sections in an industrial plant by exchanging data with a central computer that controls the process sections. The operator communicates with the process sections through a mobile wireless device remotely connected with one of the multiple wireless access points on a data network. This data network is, in turn, connected to the central computer that controls these process sections. The central computer stores the location of the process sections and the operator profiles. When requested, it collates and processes this data and presents it to the operator. Further, if the need arises, the central computer tracks and interacts with the operator.

52 Claims, 6 Drawing Sheets

DYNAMIC OPERATOR FUNCTIONS BASED ON OPERATOR POSITION

BACKGROUND OF THE INVENTION

1. Field of the Invention

The present invention relates to industrial control systems. More specifically, this invention relates to providing an operator with an interactive mobile wireless unit in order to communicate remotely with the industrial control system.

2. Description of Related Art

Manufacturing and process industries have become quite complex during the last few decades. Today, even a small manufacturing plant can easily contain several hundreds to several thousands of manufacturing and processing machines. These machines are usually connected to each other intricately to form sub-systems, which in turn, are connected to form larger systems, and so on, until together they form the entire plant. Since these individual machines are connected so intricately, a small variation in the output of one machine (or of an equipment) can easily result in malfunction of another machine or can even result in the final product being unacceptable. Hence, in all such industries today, there is a need to continuously monitor and control various chemical, mechanical and related processes.

In a typical industrial plant, which could, for instance, be a power plant, a refinery, a paper mill, or a petrochemical plant, a Distributed Control System (DCS) is used to monitor and control various processes. The Distributed Control System of the plant would usually have a centralised control room, and multiple controller and operator stations. The control room has a process controller and a process I/O subsystem. These are connected to the controller and operator stations through a communication bus. Since this communication bus is absolutely vital for the smooth operation of the plant, the bus is usually designed so that it has a high degree of fault tolerance and built-in redundancy. In addition to being connected to the controller and operator stations, the process 110 subsystem is also connected to various analog and digital field devices. Field devices are well known in the prior art related to control systems. The field devices include various types of analytical and monitoring equipment such as pressure sensors, temperature detectors, thermocouples, strain gauges, limit switches, on/off switches, flow transmitters, pressure transmitters, capacitance level switches, valve controllers and solenoids. The monitoring of various processes by the distributed control system usually involves collecting periodic data from these systems and controlling the parameters that govern these systems.

In rudimentary distributed control systems, any qualified user such as an operator, a technician or an engineer would periodically visit various machines and equipment and gather data from the associated measuring instruments. The same or a different operator would then collate and interpret this data, and, if required, prescribe a corrective action depending upon the results. Clearly such distributed control systems require a lot of human effort and are costly. Also, since it takes substantial time for the operator to gather, collate and interpret the data, such systems are not able to handle emergency situations. Hence, it is not surprising that most distributed control systems in manufacturing and processing industries have moved onto higher levels of automation and integration.

In contemporary automated distributed control systems, the monitoring and the control of various systems and sub-systems are done by a central process control system. In such systems, an operator would usually reside in the central process controlling area and would monitor and control different parameters of various machines and systems (from this central process controlling area). However, even in these automated systems, situations arise when an operator would have to physically visit a site and inspect a machine, a sub-system or an entire system, change set points or make other adjustments during times of ordinary production or process flow. Most production inspections are fairly routine and pre-scheduled. There can also arise inspections that are scheduled for regular or anticipated maintenance purposes. In addition, inspections may also be un-scheduled and some may even arise because of emergencies. One frequent example of such an un-scheduled inspection is when the operator suspects that certain monitoring equipment—such as a pressure sensor—is malfunctioning. In such a case, the operator is likely to physically visit the machine (or the system) and use his/her domain knowledge so as to identify and possibly rectify the problem. Indeed, when an operator visits the site, he/she would usually require real-time status information regarding the system (and/or other interconnected systems) so that the problem can be identified and rectified. Hence, proper co-ordination is required between the operator and the central process control system. There are several methods known in the prior art that provide status information of a system (or systems) to an operator when he/she visits a particular site; these are briefly discussed below.

In a simple implementation, each system is provided with a display terminal. The terminal collates the status information of the machine and equipment from the various sensors and measuring instruments. If required, the status information of this machine, or of the sub-system or the entire system, may be further collated by the central process control system and sent to this terminal. In some cases, the maintenance of a particular machine, sub-system or an entire system may require information to be gathered from connected systems. In such a case, this terminal may query other terminals (and/or the central process control system). After all the information has been retrieved and collated by the terminal, it is presented to the operator. The operator uses the information to identify the problem with the machine or the system. In some cases, the terminal may also provide the ability to control the machine or the entire system, by setting appropriate parameters, so that the operator can rectify the problem. This implementation suffers from two major drawbacks. The first drawback is that one terminal has to be provided for each machine to be monitored; hence, thousands of such terminals are required and this may render the entire solution economically infeasible (especially, if these terminals are being used only for infrequent inspections). The second major drawback is that in order to retrieve the information from other machines or from connected systems, the terminal may have to query the central process control system many times; consequently, a large number of such queries may result in over-loading of the central process control system.

An alternate solution provides a computer system and a terminal placed in each process section of the plant. This terminal would collate the information from various related systems in the process section, and provide a comprehensive report to the operator. This value added information would enable quicker inspection runs and faster identification of various faults in the systems. A modification of this solution is also proposed wherein these terminals may be provided with multiple profiles, i.e., different ways of presenting the status information. The status information is customised either locally on the terminal itself or centrally on the central process control system and then sent to the terminal. An important advantage of this modification is that operators with different expertise are presented different views of the same information. For example, the service technician may be provided a more detailed and exhaustive view of the status information compared to a more collated view for a process engineer. Clearly, since this information is suitably refined for the operator, this solution will improve the efficiency of the inspection process. Furthermore, since a computer system has been provided in each process section and since the terminal may collate and customise the status information, the load on the communication bus and on the central process control system is reduced. In today's automated industries, and unmanned process sections, it may not be feasible to provide each process section with a computer system and terminal, since these would not be utilized frequently.

A third solution known in prior art proposes equipping every technician with a mobile device. This mobile device communicates with a centralized computer system over a communication network. The communication network may be wired or wireless. In a wired implementation, the mobile device would be connected to the wired network, called a Local Area Network (LAN), at one of a finite number of LAN access points. In a wireless network, a wireless link (which may be formed using Radio Frequency (RF) waves, infrared waves, ultrasound waves, etc.) could be used to establish communication between the mobile device and the central process control system. The prior art proposes that the central process control system provides the mobile device with the status information of systems in the vicinity of the mobile device. In order to determine the systems in the vicinity of the mobile device, in both the wired and the wireless case, the physical location of the mobile device needs to be determined first. In the wired case, the location of the mobile device can be determined by its proximity to a particular wired access point, whereas, in the wireless case, several location-determining means that are already known in the prior art, may be used to locate the mobile device. (These means include placing a number of sources of electromagnetic waves in the field, and determining the location of the mobile device relative to these sources.) In this implementation, once the location of the mobile device has been determined, a means is required to identify the machine or the system for which the status information is required. In some implementations, the mobile device may itself point and identify the physical system for which the status information is required. Four patents given below disclose various kinds of mobile devices known in prior art.

WO Patent 9319414, which is titled "Portable exploitation and control system", discloses a portable device for controlling one or more remote systems. This portable device communicates with the remote system over an unspecified wired or wireless communication link. It is envisaged that this portable device is provided with multiple application software for controlling multiple remote systems, wherein each remote system has a corresponding application software. The portable device is intended primarily for use with remote military devices, such as unmanned vehicles and electronic weapon systems. Accordingly, a rugged design of the device to facilitate use in the field is proposed. The invention does not elaborate on the nature of the communication link or the nature of information transmitted. Further, the invention is designed as a push system, wherein information or a control signal flows from the portable device to the remote system. In other words, it is the operator who can get information from the central process control system, and never vice versa.

WO Patent 9612993, which is titled "Apparatus for providing access to field devices in a distributed control system", discloses an apparatus for providing wireless access to multiple field devices in a Distributed Control System. Field devices refer to devices that are typically found in various industries. These devices are generally remote from the central process control system. They include pumps, valves, pressure transmitters, temperature transmitters, flow transmitters and other such devices. All these devices are connected to a fieldbus control network. The fieldbus is a communication bus that forms the connection between the field devices and the central process control system. The invention contemplates that each field device is equipped with a wireless access port so that a wireless handheld device has access to the field device. In an alternative embodiment, the wireless access port can be located on a fieldbus module that provides access to a plurality of field devices. Thus a wireless handheld device can access these devices through this module.

U.S. Pat. No. 5,598,572, which is titled "Information terminal system getting information based on a location and a direction of a portable terminal device", discloses a mobile device that points to and identifies the system to be inspected. The central process control system maintains a database of unique characteristics of each machine, subsystem and of each system. The invention suggests using the location, the physical appearance, the characteristic sound and/or the temperature profile of the system, to uniquely identify the system. Once the mobile device identifies a system, it conveys the observed characteristics to the central process control system, and the two together can distinguish the system based on its unique characteristics. Alternatively, the machine or the system may bear a unique identification code, such as a bar code, and the mobile device can be equipped with an identifying means, such as a bar code reader, to identify the system. Alternatively, the system may be equipped with a code-transmitting unit. This transmitting unit would then identify the system to a mobile device in its vicinity and the mobile device would identify the system appropriately. In either case, once the machine or the system has been uniquely identified, the unique identifier is used to query the central process control system to extract the status information of this machine, system and of other connected systems.

U.S. Pat. No. 6,167,464, which is titled "Mobile human/machine interface for use with industrial control systems for controlling the operation of process executed on spatially separate machines", discloses a mobile device, called a Human-Machine Interface (HMI) that interacts with a wired LAN. The wired LAN connects various systems in an industrial plant and a central computer; this central process control system controls the processes occurring on these systems. Each local part of the system in the manufacturing or processing plant has status information and a control program. An operator uses the mobile device to query the state of a system. The mobile device communicates with the central process control system using a Radio Frequency (RF) link. The mobile device identifies the machine or the system by means as mentioned above and by other means that are well known in prior art. In one embodiment of this invention, the wired LAN is only used for process control and is not employed by the mobile device. In yet another embodiment of the same invention, the mobile device communicates with the local part of the system in the manufacturing or processing plant directly rather than with the central process control system. Further, the mobile device now broadcasts its identification over a short range RF link to a detector provided on each system. The detector uses the wired LAN to extract information and programs from the central process control system, and provides these to the mobile device. This invention also contemplates providing only the appropriate status information to various users operating on the mobile device.

The processes and systems in manufacturing and processing industries are becoming increasingly more complex. For these systems, the status information is often very complicated and still has to be interpreted in a short period of time. Thus, the need for a mobile device that can analyse and present this information in a suitable manner is imperative. The technologies are evolving at great pace and new and better functionalities are being added to these mobile devices. It would be beneficial if the mobile device may be able to interact with the central process control system and obtain the relevant information immediately. The mobile devices mentioned in the prior art extracted information primarily from a central repository.

The inventors envision that in order to quickly complete normal production, maintenance and inspection routines, the real-time information should be available at all levels and a more interactive and responsive mobile device is required. And, of course, such a mobile device has to be tailor-made for different users (with different profiles). Further, if there were a means of tracking these mobile devices, then a particular user, operator or engineer could be quickly located in an emergency. In addition to tracking the operator, information regarding the nature of the emergency could be quickly communicated. Further, the operator could then use the mobile device to check the status of other systems that may be affected (by such an emergency), and issue control instructions. The central process control system could then carry out these control instructions.

In addition to all the above-mentioned salient features in addition to normal production use (that are critical for handling emergencies and disruptions in real-time), there is a need for the mobile devices to be used by the operators in an interactive manner in order to effectively and efficiently schedule maintenance programs. Thus, enhancing the mobile computing device by incorporating a tracking means, will lead to significant productivity improvements.

The above-mentioned desirable characteristics of the mobile device can be implemented by the use of Radio Frequency (RF) devices. Short range wireless standards including HomeRF, 802.11, Bluetooth, and several others are being developed and deployed so that various mobile devices can be connected to wired LANs that already exist in buildings, plants, manufacturing companies, and warehouses. One standard known as Bluetooth protocol offers short-range communication between Bluetooth enabled devices by using wireless access points. Bluetooth technology uses radio waves at a frequency of 2.45 Giga Hertz and currently permits data transfer rates of up to 1 Megabit per second. The high data transfer rate enables Bluetooth devices to carry up to three simultaneous synchronous voice channels. Hence, these high data transfer rates permit increased interactivity. Further, Bluetooth uses spread-spectrum frequency hopping technology, wherein the frequency at which communication occurs, is switched periodically. This feature enables the mobile devices to remain networked even in noisy environments. Another important feature of Bluetooth enabled device is that it remains passively connected to the network, once a connection has been established. There is low energy consumption of the Bluetooth enabled device while it is not actively communicating with the network.

SUMMARY OF THE INVENTION

It is an aim of the invention to provide a communication system that enables an operator to remotely query and control process sections in an industrial plant by exchanging information with a central control system that controls the process sections.

To attain the above-mentioned aim, the communication system comprises plurality of wireless access points spread throughout the plant on a data network, a mobile wireless device that provides access to the operator to exchange data with the central control system, and a control system interface that connects the mobile wireless device with the central control system using the wireless access points on the data network.

The mobile wireless device preferably includes an input means, such as a touch screen, a voice interface, a keyboard or a mouse, for inputting information; an output means, such as a graphical display screen or a headset, for outputting the information obtained from the central control system, and a wireless communication means, including but not limiting to a Radio Frequency (RF) antenna, an Infrared (IR) antenna, an Ultrasonic antenna, or an antenna based on similar wireless technologies known in prior art.

Further, the mobile wireless device has a means to enable the operator to login to the central control system or the mobile wireless device.

In an alternative embodiment of the invention, an interactive industrial control system is provided that can be remotely accessed by an operator equipped with a mobile wireless device.

In another alternative embodiment, the invention provides status information from a process section, which may be customized according to the profile of the operator equipped with a mobile wireless device.

In yet another alternative embodiment, the invention is used to locate and track an operator equipped with a mobile wireless device in an industrial plant using a plurality of wireless access points.

Preferably, the industrial control system maintains a database of the profiles for each operator and dynamically updates a table containing the information about the mobile wireless device into which each operator has been, or can be, logged on to. The industrial control system also maintains information about the process sections located in a vicinity of each wireless access point. The industrial control system may also use software objects to represent the process sections, has a list of pre-defined characteristics of these objects, and structures these objects in an object-hierarchy or some other object classification.

Therefore, the use of above-mentioned communication system provides the operator the ability to remotely interact with the central control system. The invention also allows this interaction to be tailored for a particular operator and process section. This invention also provides a higher degree of interactivity, such as voice-enabled communication, between the operator and the central control system. The invention thus leads to significant reductions in the time required to carry out normal production operations as well as to gather, analyse and troubleshoot processes in the industrial plant.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Figure 1:
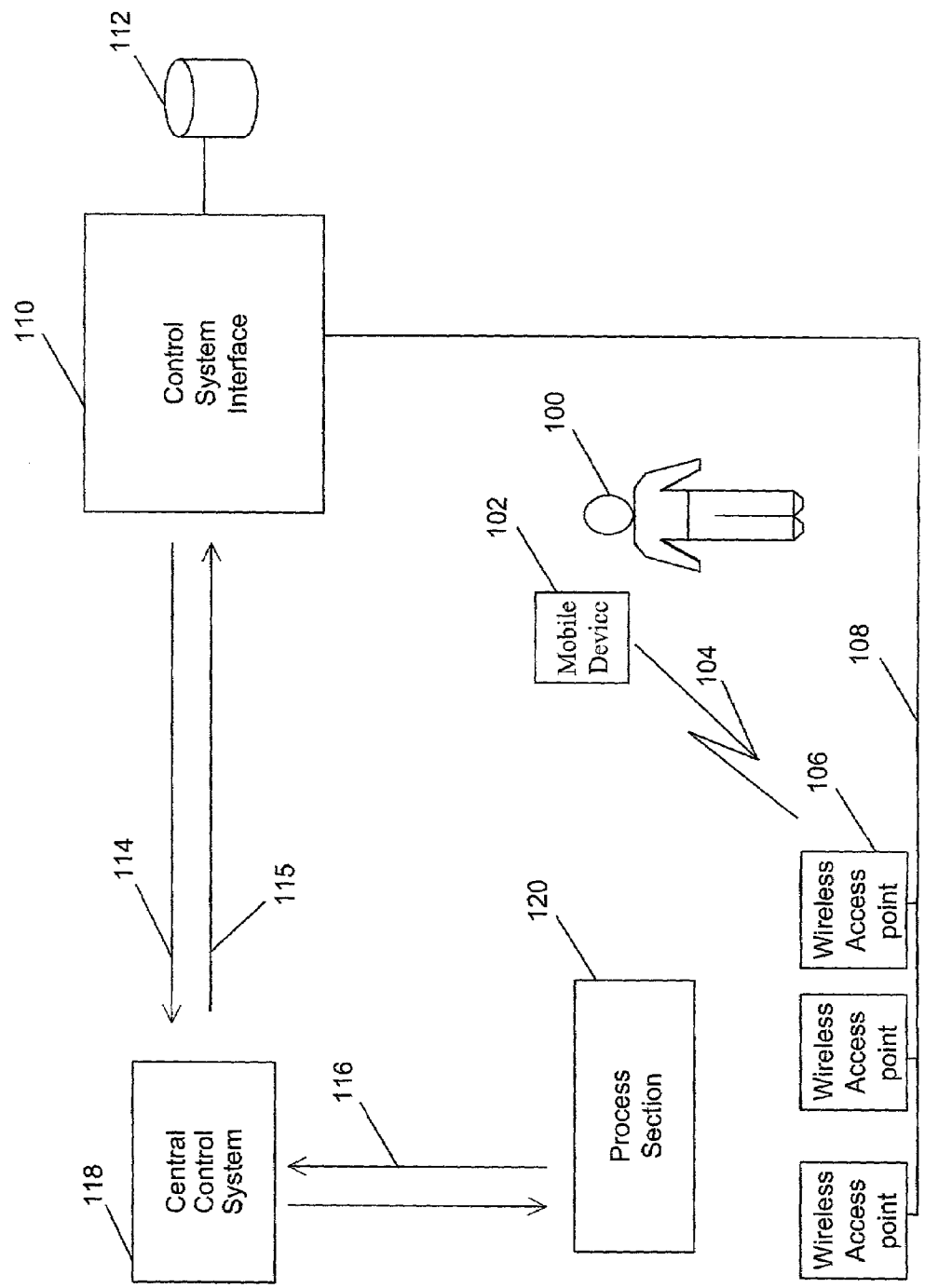
FIG. 1 is a block diagram showing an operator remotely accessing process sections in an industrial plant according to an embodiment of the present invention.

FIG. 1 is a block diagram showing an operator remotely accessing process sections in an industrial plant. A manufacturing or process industry contains many process sections and one such process section 120 is shown in FIG. 1. A process section may be a large section such as a production line, a bleaching plant or a paper machine or a small section of a process such as a single apparatus. There are many machines and/or sub-systems in a process section 120 that are interconnected to execute a specific process. In most industries, there is a central control system 118 to control and monitor process sections 120. The central control system 118 co-ordinates and controls various process sections 120 over a data network. The data network is usually a wired LAN connecting the process sections 120 to the central control system 118. The central control system 118 receives status information 116 from the process sections 120 and sends control instructions for the process section over the data network. The flow of status information and the control instructions allow the central control system to monitor and control each machine and/or subsystem in each process section 120. The central control system 118 refers to a centralized system for monitoring and controlling individual machines, subsystems or process sections 120 in the industrial plant. There are multiple commercial implementations of centralized control systems.

The present invention allows an operator 100 to remotely query and control a process section 120 in the industrial plant. During normal production operations, the operator 100 may physically visit the site of the process section 120 to physically inspect or to gain access to the information about the process section 120. The present invention provides the operator 100 with a mobile wireless device 102 to interact with the process section 120. The mobile wireless device 102 is connected over a communication link 104 to a wireless access point 106. The wireless access point 106 is connected to a control system interface 110 through a data network 108. The control system interface 110 provides the ability to send and receive information from the central control system 118, thereby connecting the mobile device 102 to the central control system 118. The control system interface 110 sends query and control instructions 114 to the central control system 118. The central control system 118 accordingly returns the status information 115 of the process section 120.

The present invention may be used by an operator 100 in the normal course of a production run in the industrial plant. The mobile wireless device 102 enables the operator 100 to elegantly control the process section 120 by issuing appropriate control instructions. The operator 100 may also use the present invention during scheduled maintenance runs. The ability to remotely access the information regarding the process section 120 enables the maintenance runs to be quickly completed. Further, the present invention may also be used in an emergency in a process section 120. The operator 100 is then located using the present invention by the method shown in FIG. 6.

In the preferred embodiment, the mobile wireless device 102 is a thin client, i.e., a hardware device running a software that uses fewer and smaller amount of resources, including but not limiting to low processing power, low memory requirements, less weight, and low battery usage. The status information is processed by the control system interface 110. This mobile wireless device 102 is readily portable and the minimal requirements keep costs low. The mobile wireless device 102 may thus be equipped with a simple input means such as a touch screen.

Further, the mobile wireless device 102 may have either a simple text-based display or a graphical display. It will be appreciated by those skilled in the art that the mobile wireless device 102 may equivalently be a powerful computing device, and that such mobile wireless devices 102 may become economically feasible in the near future. There are many handheld computing devices available that are configured or may easily be configured for communication and wireless communication. A Personal Digital Assistant (PDA) product or similar devices such as a Palm Piloff™, a HP Jomada™, a Compaq Ipaq™ or a Psion™ PDA can be used as the mobile wireless device 102. A computerised mobile telephone such as the Ericsson R380™ and the Nokia Communicator™ can also be used as the mobile wireless device 102.

The present invention enables an operator to query and control a process section 120 remotely. In the preferred embodiment, the operator 100 carrying the mobile wireless device 102 approaches one of many wireless access points 106. The wireless access points 106 may be distributed over a relatively large area in the industrial plant. The mobile device 102 (or a wireless access point that is in the vicinity of the mobile device) sets up a communication link 104 with a wireless access point 106 in its vicinity (with the mobile device, respectively) by methods known in prior art. The communication link 104 permits the operator 100 to communicate with the control system interface 110. The process section 120 in the vicinity of the mobile wireless device 102 is then determined, using information regarding placement of the wireless access points 106 in the industrial plant.

The control system interface 110 provides the necessary interface between an operator 100 in a process section 120 and the central control system 118. The information about a particular process section 120 may be further customized for the operator 100 by the control system interface 110. An operator 100 visiting a process section 120 would preferably be offered access only to relevant information about the process section 120. Thus, of all the information available in the central control system 118 about a process section 120, only a selected "view" is preferably provided to the operator 100. The information may be selected by the control system interface 110 according to the job function of the operator 100. The job function of the operator 100 and other information relevant to selecting information from a process section 120 are stored in an operator profile. Accordingly the control system interface 110 maintains one or more databases 112. Firstly, the databases would contain the authorized list of operators 100. This database 112 would enable establishing access rights for an operator 100. Further, the databases 112 would contain information regarding the process sections 120 in the vicinity of each wireless access point 106. Thus, once a communication link 104 is established by the mobile wireless device 102 with any one of the access points 106, the location of the mobile wireless device 102 is determined by the control system interface 110. Further, the databases 112 would contain the operator profiles. These operator profiles are used by the control system interface 110 to select information from a process section 120 to be sent to a particular operator 100. While a single database is illustrated and described in FIG. 2, it will be obvious that this information may alternatively be distributed among more than one database.

Figure 2:
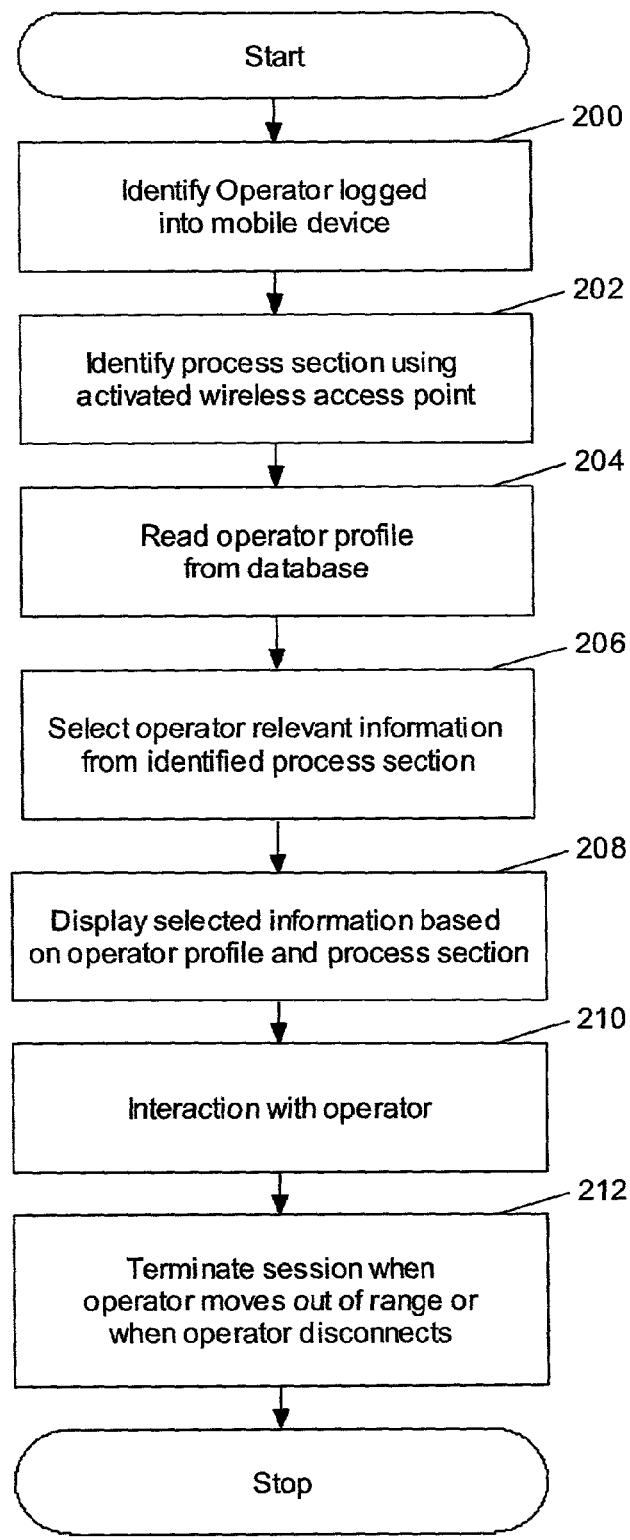
FIG. 2 is a flowchart of a method of interacting with a central control system according to an embodiment of the present invention.
Figure 4:
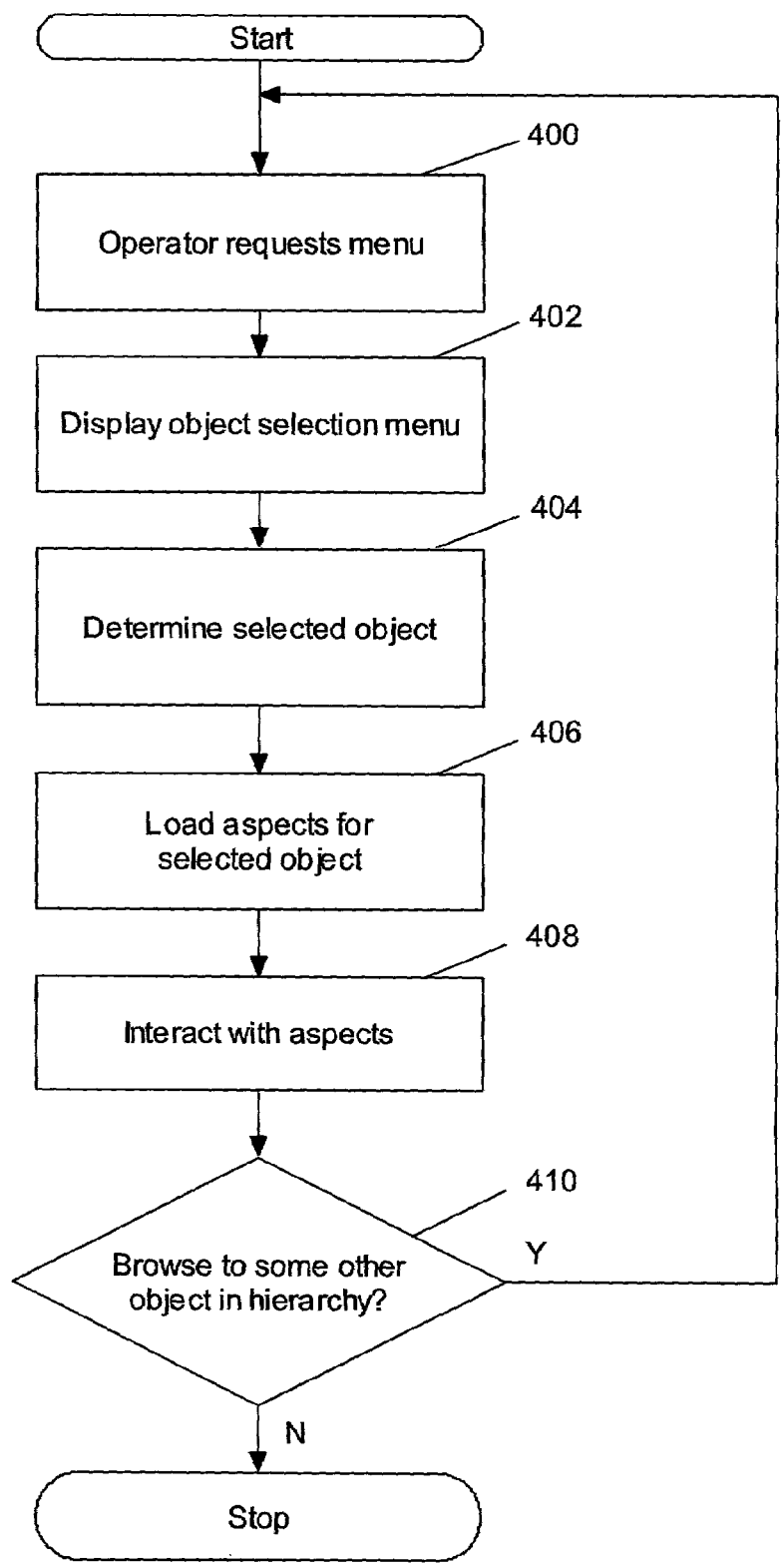
FIG. 4 is a flowchart of a method of browsing an industrial plant using a hierarchy of objects in an industrial plant according to another embodiment of the present invention.

FIG. 2 illustrates the method by which the operator 100 interacts with the central control system 118 to query and control a process section 120. In step 200 the operator 100 of the mobile wireless device 102 is identified by the control system interface 110 by means of login information of the operator 100 provided by the mobile wireless device 102. In step 202, the location of the operator 100 is determined to be in one of the process sections 120 by using the location information of each wireless access point stored in the database 112. The wireless access point 106 may detect the mobile wireless device 100 by methods known in the prior art. In the preferred embodiment, the mobile wireless device 102 broadcasts a request signal and waits for an acknowledgment signal from a wireless access point 106 in the vicinity. Once a wireless access point 106 establishes a communication with the mobile wireless device 102, the process section 120 is identified as the one in which the wireless access point 106 is present. In step 204, the control system interface 110 reads the profile of the identified operator 100 from the database 110 in the control system interface 110. In step 206, the information of the determined process section 120 is then obtained by sending one or more queries 114 to the central control system 118. In step 208, this information from the process section 120 is customized according to the profile of the operator 100. In step 210, the interaction with the operator 100 commences. Thus, the operator 100 studies the information about the process section 120 and issues certain control instructions, if required. Alternatively, the operator 100 may need to investigate further, possibly in other process sections 120. In this case, the operator 100 may either physically visit another process section 120, or may use the established communication link 104 with the control system interface 110 to navigate through information from other process sections of the plant. The method for navigating to obtain information regarding other process sections is depicted in FIG. 4. In step 212, the communication link 104 is terminated when the operator 116 moves out of range of a wireless access point. The operator 100 may also wilfully terminate the communication link 104.

Figure 3:
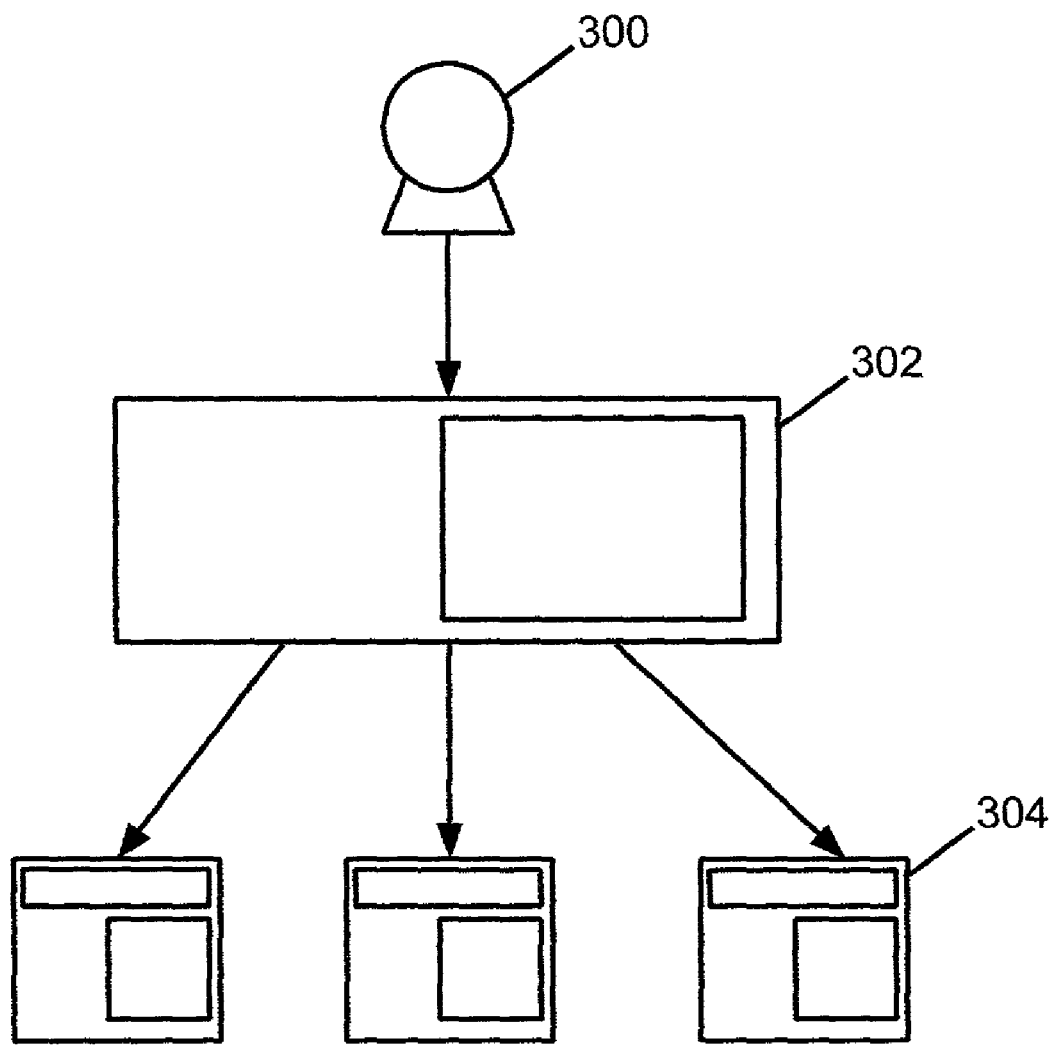
FIG. 3 is a block diagram showing process sections modelled as objects in an industrial plant according to an embodiment of the present invention.

The present invention provides a means for enabling the operator 100 to navigate in the control system to remotely control any process section 120 in the industrial plant. The present invention permits this navigation function once the operator 100 has established a communication link with any wireless access point 106. This navigation is preferably customized based on the profile of the operator or any other user. In order to enable easy navigation through the industrial plant, various process sections in the industrial plant are represented using abstract objects. The abstraction concept is further elaborated in FIG. 3. A real object 300, such as a machine, a sub-system or a process section is represented using a software object 302. Different facets of a real world object 300, such as its physical location, the current stage in a process, a control function, an operator interaction, a simulation model, some documentation about the object and other features, may each be described as different aspects 304 of the software object 302. Thus, in the preferred embodiment, each software object 302 contains a list of aspects 304, a selection of which are presented to the operator 100, when the corresponding real object 300 is accessed.

FIG. 4 illustrates the method by which an operator 100 of a mobile wireless device 102 browses the industrial plant. This method is best carried out when the industrial plant is represented within the control system as a hierarchy of software objects 302. In step 400, the operator presses a button or activates other input means to request a menu of a list of software objects 302, to be displayed on the mobile wireless device 102. In step 402, the list of objects is determined according to the profile of the operator and the location of the operator as determined in steps 200 to 208, and the list of objects is displayed on the mobile wireless device 102. In step 404, the operator 100 selects an object 302 from the displayed menu. In step 406, the control system interface 110 selects a sub-list of aspects 304 of all aspects of the selected software object 302, by using the operator's profile. In step 408, the operator 100 obtains information, shown as aspects 304, regarding the software objects 302, corresponding to a process section 120. Thus, the operator 100 is able to interact with the aspects 304 of a particular selected object 302, thereby being able to query and control the real object 300, for example, the process section 120.

Further, the operator 100 may wish to obtain information regarding a specific object in the object-hierarchy using the mobile wireless device 102. In step 410, the operator 100 may choose to continue this process of browsing for specific objects in the object-hierarchy. Thus, the operator 100 is able to browse through all the objects 302 in the object-hierarchy of the plant and obtain customised information regarding a real object 300 in the plant.

In the present invention, a hierarchy of software objects 302 is envisioned to model the industrial plant. It will be appreciated by those skilled in the art that for the purpose of enabling an operator to browse in the industrial plant, any well-defined categorization of these software objects 302 is adequate, and a strict hierarchy is not necessary. Thus, the present invention covers various well-known taxonomies for these software objects 302, including but not limiting to, those based on physical similarity and functional similarity of the real objects 300. These categories, generated from the above mentioned classification scheme, could be suitably linked together, not necessarily in an hierarchy, to permit the operator 100 to browse through the industrial plant.

The attainment of the above-mentioned functionalities requires a control system that monitors and controls the individual process sections in a plant. The present invention is best carried out in conjunction with a Control IT™ control system manufactured by ABB.

The wireless communication protocol used to establish and maintain the communication link 104 may be one of many known in prior art. Popular wireless protocols include IEEE 802.11 and Bluetooth. In an alternative embodiment of the present invention, Bluetooth communication protocol is used in the communication link 104. In this embodiment, the mobile wireless device 102 may have voice input and output capabilities, to permit an operator 100 hands-free access to information regarding process sections 120. A few particular features of Bluetooth communication protocol, mentioned below, highlight the advantages of this alternate embodiment of the present invention.

Figure 5:
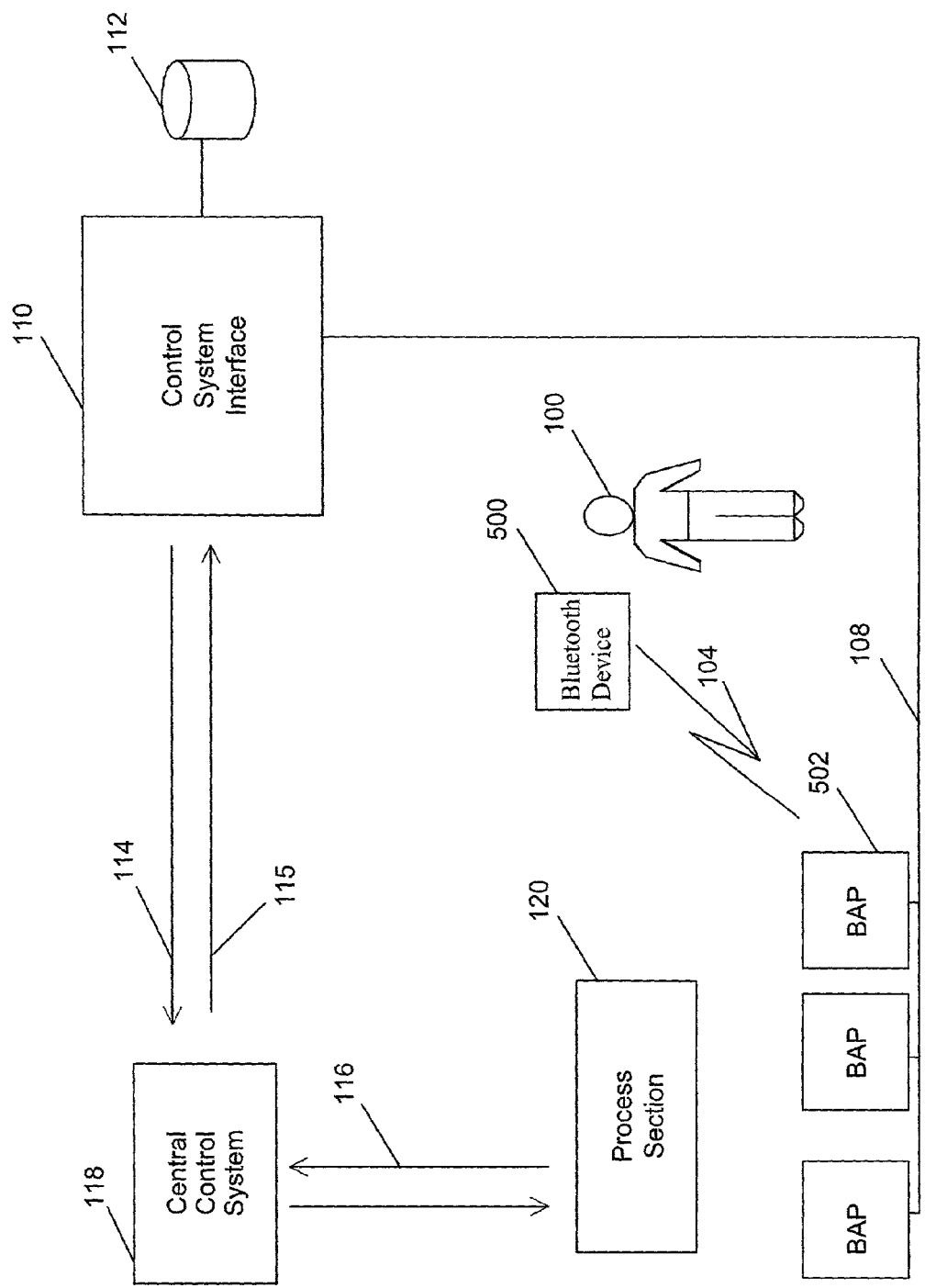
FIG. 5 illustrates the Bluetooth communication protocol used according to a preferred embodiment of the present invention.

FIG. 5 illustrates an industrial control system that uses the Bluetooth protocol over the wireless communication link 104 between a Bluetooth enabled mobile wireless device 500 and a Bluetooth access point 502. One example of a commercial Bluetooth access points is the Bluetooth local infotainment point (Blip) manufactured by Ericsson. Another example is the AXIS 9010 access point from Axis Corporation (of Lund, Sweden) that is also a Bluetooth access point. Also, the Bluetooth protocol is based on spread-spectrum frequency hopping technology. The Bluetooth enabled devices remain networked with each other at 79 different frequencies and the frequencies can change as rapidly as 1600 times per second. Thus, the Bluetooth access point 502 and the Bluetooth enabled mobile wireless device 500 can remain connected in very noisy environments. This might prove particularly beneficial in noisy process sections, where there may be high interference in the communication link 104 due to existing electromagnetic waves. Unlike a Bluetooth communication link, a normal static link might be repeatedly interrupted, and hence rendered ineffective, in such a process section.

Another important characteristic of Bluetooth is that the Bluetooth enabled devices remain passively networked with each other, once a connection has been established. This characteristic can be used to locate the Bluetooth enabled mobile wireless device, as it remains passively networked with the Bluetooth access points. Yet another key feature of Bluetooth is the high data transfer rates that can be achieved. Up to 1 Megabit per second of data transfer is currently possible using Bluetooth. Hence, the Bluetooth enabled mobile wireless units can receive high-resolution graphical content. The high data transfer rate also enables Bluetooth devices to carry up to three simultaneous synchronous voice channels. Thus, the Bluetooth enabled device can also be a headset that receives voice data. This headset implementation may be of great importance in cases where carrying the hand-held graphical display unit might be a problem. In addition, Bluetooth protocol is designed to operate with minimal energy consumption, thus permitting longer periods of uninterrupted connectivity.

Figure 6:
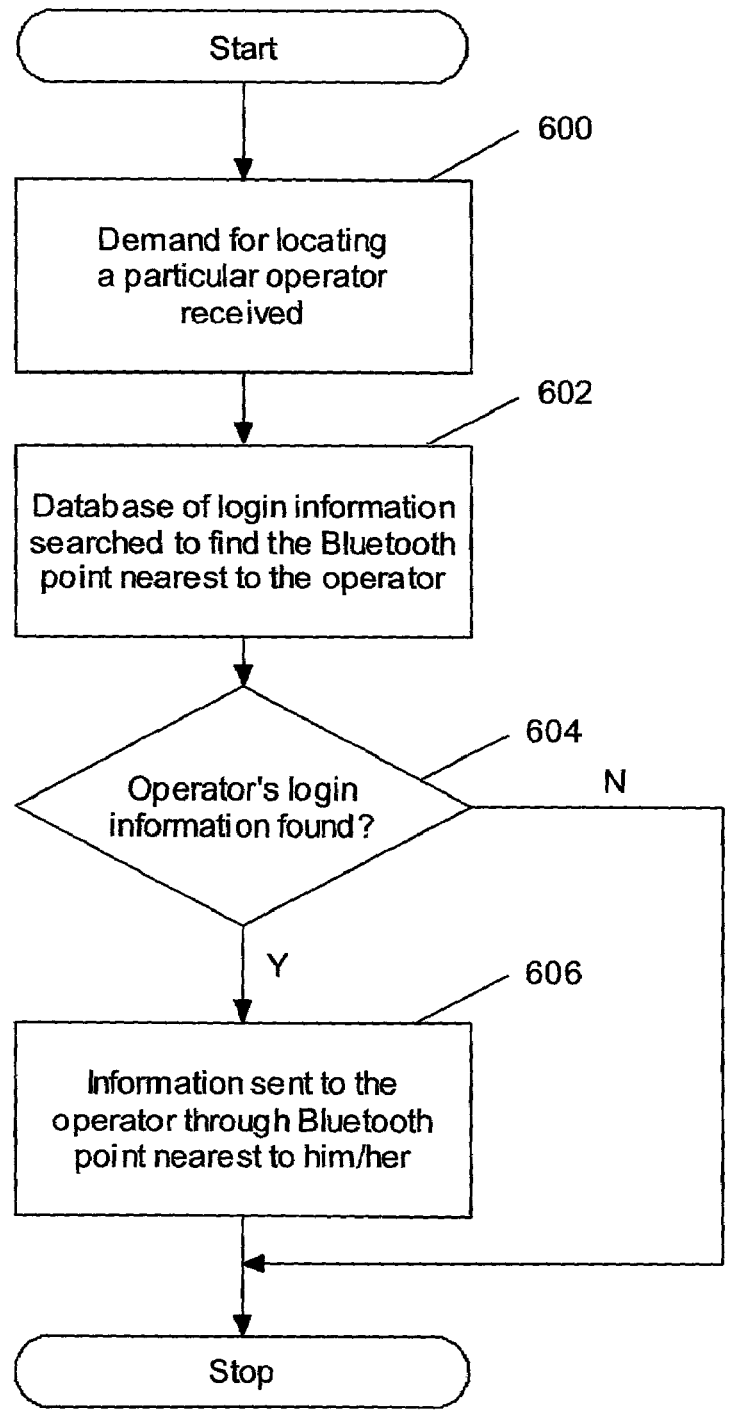
FIG. 6 is a flowchart of a method of locating an operator in an industrial plant according to another further embodiment of the present invention.

The present invention also provides a means to track and locate an operator 100 in the industrial plant. This feature is particularly useful in case of an emergency in a process section 120. In order to handle the emergency, a particular operator may need to be quickly located. The industrial control system of FIG. 5, which uses the Bluetooth protocol in an alternative embodiment, may be used to track and locate a particular operator 100. An advantage of using the Bluetooth protocol is that the Bluetooth devices remain passively connected when in the operating range. A method of locating a particular operator is illustrated in FIG. 6. In step 600, the control system interface 110 receives a demand to locate a particular operator 100. In step 602, the control system interface 110 searches a table containing the login information of each operator using a Bluetooth device 500. The table would be updated whenever a Bluetooth device 500 connects or disconnects from a Bluetooth access point 502. In step 604, if the searched operator's login information is not found in the table, the search is stopped. However, if in step 604, the search operator's login information is found, then in step 606, the relevant data is sent to the corresponding Bluetooth device 500 by the Bluetooth access point 502. The relevant data can be in the form of an alarm signal or in form of a graphical display on the Bluetooth device 500. The operator 100 would then be notified of the emergency in a process section 120, and provided with the relevant information to troubleshoot the problem.

It will be appreciated by those skilled in the art of wireless technology and control systems that the Bluetooth technology and Bluetooth devices can be easily replaced by 802.11 or HomeRF or other new wireless technologies that have either been developed or are in the process of being developed. For example, instead of using a Bluetooth access point, an Aironet 340 access point from Cisco (of San Jose, Calif., USA), which is an 802.11 access point, can be used.

In another alternative embodiment, the functions of the control system interface 110 can be carried out by the central control system 118. Thus, the central control system 118 maintains and updates the databases 112. Further, the central control system 118 customises the information and provides it to the mobile wireless device 102 through the data network 108 and the wireless access points 106.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A communication system to provide remote access, by an operator, to process sections in an industrial plant, the process sections monitored and controlled by a centralised control system, the communication system comprising:
   a data network;
   a plurality of wireless access points on the data network;
   first identifying means for identifying an operator;
   second identifying means for identifying at least one of job functions of the operator and preferences of the operator;
   a mobile wireless device provided to the operator;
   a means for connecting the mobile wireless device to one of the wireless access points;
   an interfacing means for connecting the mobile wireless device with the centralised control system using the data network;
   means for enabling the operator equipped with the mobile wireless device to query the centralised control system for status information pertaining to the process sections, via the interfacing means;
   means for customizing the status information, by the centralised control system for the operator based on a current location of the operator and the identified at least one of the job functions of the operator and the preferences of the operator;
   means for delivering the customized status information from the centralised control system to the mobile wireless device, via the interfacing means; and
   means for enabling the operator equipped with the mobile device to provide instructions to the centralised control system that request the centralised control system to control the process sections, via the interfacing means.

2. The communication system as recited in claim 1, wherein the second identifying means accesses a database containing a profile of each of a plurality of operators, wherein the profile for each of the operators specifies at least one of the job functions of the operator and the preferences of the operator.

3. The communication system as recited in claim 1, wherein the interfacing means further comprises a means to identify a selected one of the process sections which is in a vicinity of each wireless access point and wherein the means for customizing customizes the status information for the identified process section.

4. The communication system as recited in claim 1, wherein the mobile wireless device comprises:
an input means for the operator to input the queries and the control instructions for providing to the centralised control system via the interfacing means;
an output means for providing the delivered status information from the centralised control system to the operator; and
a wireless communication means for communicating with the interfacing means using the connected-to one of the wireless access points.

5. The communication system as recited in claim 4, wherein the input means of the mobile wireless device is a touch screen.

6. The communication system as recited in claim 4, wherein the input means of the mobile wireless device is a keyboard.

7. The communication system as recited in claim 4, wherein the output means of the mobile wireless device is a display screen.

8. The communication system as recited in claim 4, wherein the output means of the mobile wireless device provides voice output.

9. The communication system as recited in claim 4, wherein the wireless communication means of the mobile wireless device is a receiver transmitter means.

10. The communication system as recited in claim 1, wherein the interfacing means is hardware.

11. The communication system as recited in claim 1, wherein the interfacing means is software.

12. The communication system as recited in claim 1, wherein the mobile wireless device further comprises log-in means enabling the operator to be identified.

13. The communication system as recited in claim 12, wherein the log-in means enables the operator to log-in into either the centralised control system or the mobile wireless device.

14. The communication system as recited in claim 1, wherein the mobile wireless device is provided with a radio frequency means to communicate with the wireless access points.

15. The communication system as recited in claim 14, wherein the mobile wireless device uses IEEE 802.11 wireless protocol.

16. The communication system as recited in claim 14, wherein the mobile wireless device uses HomeRF communication protocol.

17. The communication system as recited in claim 1, wherein the wireless access points use Bluetooth communication protocol, the mobile wireless device being a Bluetooth enabled device.

18. The communication system as recited in claim 17, wherein the mobile wireless device processes voice data.

19. The communication system as recited in claim 1, wherein the mobile wireless device has a storing means to store information pertaining to a plurality of the process sections.

20. The communication system as recited in claim 1, wherein the mobile wireless device is also a computing device.

21. The communication system as recited in claim 1, wherein the means for connecting the mobile wireless device connects with a selected one of the wireless access points, the selected one being that one of the wireless access points which is physically nearest the mobile wireless device.

22. The communication system as recited in claim 1, wherein the interfacing means uses software objects to represent the process sections.

23. The communication system as recited in claim 22, wherein the interfacing means has a list of pre-defined characteristics for each software object, such that the operator can interact with the pre-defined characteristics of at least one selected one of the process sections, the pre-defined characteristics of the selected one determined by reference to the pre-defined characteristics in the list.

24. The communication system as recited in claim 22, wherein the interfacing means has the software objects categorized according to a predetermined scheme, and the categories are linked together.

25. An industrial control system connected on a data network suitable for an operator to remotely query and remotely control process sections in an industrial plant, the industrial control system comprising:
a centralised control system that monitors and controls the process sections over the data network;
a plurality of wireless access points on the data network;
a mobile wireless device that communicates wirelessly with the centralised control system using one of the wireless access points to which the mobile wireless device is communicably connected;
a database containing a profile of each of a plurality of operators;
a customizer at the centralised control system for customizing status information about selected ones of the process sections, using a selected one of the profiles from the database, wherein the selected one of the profiles is the profile of an operator who is equipped with the mobile wireless device;
whereby the operator equipped with the mobile wireless device communicates with the centralised control system using the connected-to wireless access point to issue queries to obtain the customized status information about the selected process sections, the selected process sections being those which the operator is physically nearby when issuing a request to obtain the customized status information, and to provide control instructions to the centralized control system that requests the centralized control system to control the selected process sections.

26. The industrial control system as recited in claim 25, wherein the centralised control system further comprises a means to identify, for each of the wireless access points, a selected one of the process sections that is in a vicinity of that wireless access point.

27. The industrial control system as recited in claim 25, wherein the mobile wireless device comprises:
an input means for the operator to input the queries and the control instructions for providing to the centralised control system;
an output means for providing the customized status information from the centralised control system to the operator; and a wireless communication means for communicating with the centralised control system using the connected-to one of the wireless access points.

28. The industrial control system as recited in claim 27, wherein the output means of the mobile wireless device is a touch screen.

29. The industrial control system as recited in claim 27, wherein the input means of the mobile wireless device is a keyboard.

30. The industrial control system as recited in claim 27, wherein the wireless communication means of the mobile wireless device is a transmitter receiver means.

31. The industrial control system as recited in claim 25, wherein the mobile wireless device further comprises log-in means for identifying the operator.

32. The industrial control system as recited in claim 25, wherein the mobile wireless device is provided with a radio frequency means to communicate with the wireless access points.

33. The industrial control system as recited in claim 32, wherein the mobile wireless device uses IEEE 802.11 wireless protocol.

34. The industrial control system as recited in claim 32, wherein the mobile wireless device uses HomeRF communication protocol.

35. The industrial control system as recited in claim 25, wherein the wireless access points use Bluetooth communication protocol, the mobile wireless device being a Bluetooth enabled device.

36. The industrial control system as recited in claim 35, wherein the mobile wireless device processes voice data.

37. The industrial control system as recited in claim 25, wherein the centralised control system uses software objects to represent the process sections.

38. The industrial control system as recited in claim 37, wherein the centralised control system has a list of pre-defined characteristics for each software object.

39. The industrial control system as recited in claim 37, wherein the centralised control system has the software objects categorized according to a predetermined scheme, and the categories are linked together, thereby modeling the process sections of the industrial plant and enabling the operator to remotely access and remotely control multiple process sections by navigating the linked categories.

40. The industrial control system as recited in claim 25, wherein the mobile wireless device has a storing means to store information about a plurality of the process sections.

41. The industrial control system as recited in claim 25, wherein the mobile wireless device is a computing device that analyses the obtained status information.

42. The industrial control system as recited in claim 25 wherein the mobile wireless device communicates with a selected one of the wireless access points which is located in a vicinity of the mobile wireless device.

43. A method for an operator to remotely query and remotely control process sections over a data network in an industrial plant using a mobile wireless device, the process sections being controlled by a centralised control system, the data network including a plurality of wireless access points, the method comprising the steps of:
establishing a communication link between the mobile wireless device and the centralised control system using one of the wireless access points;
identifying an operator of the mobile wireless device;
identifying a current location of the mobile wireless device;
identifying a selected one of the process sections physically near the identified current location;
locating a profile of the operator, the profile specifying at least one of job functions of the operator and preferences of the operator;
using the located profile, by the centralised control system to customize status information pertaining to the selected one of the process sections, responsive to a query request received from the mobile wireless device;
sending the customized status information from the centralised control system to the mobile wireless device for access by the operator, responsive to the query request over the established communication link; and
sending control instructions provided by the operator using the mobile wireless device to the centralised control system over the established communication link, the control instructions requesting the centralised control system to control at least one of the process sections.

44. The method as recited in claim 43, wherein the establishing step further comprising the steps of:
approaching a selected one of the wireless access points with the mobile wireless device;
transmitting a request signal from the mobile wireless device to the centralised control system in response to approaching the selected wireless access point; and
acknowledging, by the centralised control system, the transmitted request signal; and
wherein the step of identifying the current location; of the mobile wireless device uses a known location of the approached wireless access point.

45. The method as recited in claim 43, wherein the establishing step further comprises the step of:
detecting the mobile wireless device carried by the operator by searching amongst login information that indicates which operator is logged in to each of a plurality of mobile wireless devices; and wherein the step of identifying the current location of the mobile wireless device further comprises the step of using a know location of a selected one of the wireless access points which is wirelessly connected to the mobile wireless device of the operator.

46. The method as recited in claim 43, wherein the step of establishing a communication link between the mobile wireless device and the centralised control system uses a Radio Frequency link.

47. The method as recited in claim 43, wherein the step of establishing a communication link between the mobile wireless device and centralised control system uses a Bluetooth access point.

48. A computer program product for enabling a mobile wireless device to remotely query and remotely control process sections in an industrial plant through communications with a centralised control system, the centralised control system querying and controlling the process sections, the computer program product embodied on one or more computer readable media and comprising:
computer readable program code means for establishing a communication link between the mobile wireless device and the centralized control system using a wireless access point located in a vicinity of a selected one of the process sections which the mobile wireless device is near;
computer readable program code means for sending customized status information from the centralised control system to the mobile wireless device for access by an operator of the mobile wireless device, responsive to query requests received from the mobile wireless device, over the established communication link, the customized status information pertaining to the selected process section and being customized with regard to a profile of the operator, the profile specifying at least one of job functions of the operator and preferences of the operator; and computer readable program code means for sending control instructions provided by the operator using the mobile wireless device to the centralised control system over the established communication link, the control instructions requesting the centralised control system to control the selected process section.

49. The computer program product as recited in claim 48, wherein the computer readable program code means for establishing a communication link further comprises:

computer readable program code means for enabling the operator to log-in to the central control system via the mobile wireless device to enable identification of the operator and the profile of the operator.

50. The computer program product as recited in claim 48, wherein the computer readable program code means for establishing a communication link further comprises:

computer readable program code means for identifying a location of the operator.

51. The computer program product as recited in claim 48, wherein the computer readable program code means for establishing a communication link further comprises:

computer readable program code means for searching for the operator amongst operator login information stored for a plurality of mobile wireless devices, wherein the operator login information identifies a particular mobile wireless device to which the operator logged in; and computer readable program code means for identifying a location of the operator using a known location of the wireless access point wirelessly connected to the particular mobile wireless device.

52. The computer program product as recited in claim 48, wherein the computer readable program code means fix establishing a communication link further comprises:

computer readable program code means for identifying the operator;

computer readable program code means for identifying a location of the mobile wireless device; and computer readable program code means for identifying the selected one of the process sections which the mobile wireless device is near and which is located in the vicinity of the wireless access point.

* * * * *